Patented May 30, 1933

1,911,797

UNITED STATES PATENT OFFICE

WALTER ARTHUR BROWN AND GOTTHOLD HARRY MEINZER, OF LOS ANGELES, CALIFORNIA, ASSIGNORS, BY DIRECT AND MESNE ASSIGNMENTS, TO L. BLAKE-SMITH, OF SAN FRANCISCO, CALIFORNIA

METHOD OF BREAKING EMULSIONS

No Drawing. Application filed May 18, 1927. Serial No. 192,477.

This invention has reference to the separation of the constituent parts of an emulsion mixture; typically an oil and water emulsion. Although the invention is generally applicable to emulsions of various kinds and types, it finds its present most important use in connection with the breaking and separation of petroleum-water emulsions.

It is generally known that natural petroleum emulsions, produced in large quantities from flowing wells, are of the water-in-oil type; that is, the water is in microscopic globules and forms the disperse phase while the oil forms the continuous phase. The invention is, in its broad aspects and principles, applicable to emulsions of any type and of any immiscible liquids, but as its practical application of most value is concerned with the water-in-oil type of petroleum-water emulsions, the following detailed description will deal most specifically with that type of emulsion.

The water-in-oil emulsions of which we speak are in many cases very stable, and will not of themselves break down on long standing or by the simple application of moderate temperature below the boiling point of water. Their stability is due to the presence of what is termed an emulsifying or stabilizing agent or protective colloid at the interface or surface of contact between the two liquids. A stabilizing agent for a water-in-oil emulsion may be generally characterized as a substance or compound that decreases the surface tension of oil more than the surface tension of water; the opposite being true of an emulsifying agent that will stabilize an oil-in-water emulsion. In the absence of such an emulsifying agent a mixture of emulsion form is not stable; and by removal of the stabilizing agent, or neutralization or modification of its effect, the emulsion is rendered unstable and can then be easily separated into two continuous phases.

The potential energy of such an emulsion system is higher than the potential energy in a system in which the oil and water form two continuous phases. Any stable emulsion system comprised of two immiscible liquids, such as water dispersed in oil, naturally tends to assume the state in which its potential energy is a minimum, i. e., a state in which its interfacial energy is a minimum, which state is attained when the disperse phase has become continuous, but the coagulation of the disperse phase into a continuous phase is prevented by the presence of a protecting film of emulsifying agent which is held by adsorption at the interface of the oil and water, this film or membrane completely surrounding every globule of dispersed water, prevents the coalesence of two adjacent particles. To disturb or break down the stability or equilibrium of an emulsion system by disturbing the continuity of the protecting film of emulsifying agent to remove or neutralize or modify the effect of the emulsifying agent, and to collect the emulsified particles into two continuous phases, comprise the general object of this invention.

The method in its most preferred form comprises three general steps, which may be generally stated as follows:

(1) Decreasing the stability of the emulsion by mechanically disturbing its stability by weakening the protecting film of emulsifying agent for the purpose of allowing and assisting the subsequent actions to take place.

(2) Neutralizing the effect of, or modifying or removing, the emulsifying agent or stabilizer, and thus removing or modifying the cause which prevents the oil and water from separating into two continuous phases.

(3) Inducing coalescence of the particles of the disperse phase so as to bring them into a continuous phase. Being brought into a continuous phase the water settles out and the separation is complete.

We prefer to warm the emulsions during the application of our method, and for some emulsions this appears to be necessary. In practically all cases the application of heat facilitates our operations; but the temperature is never carried high enough to vaporize the water.

*I—Decreasing the stability by mechanical means*

The stability of an emulsion depends on the balancing of the interfacial forces acting at the surfaces of contact between the oil and water. These surface forces tend to bring the system to a state of greatest stability or minimum potential energy. The presence of an emulsifying agent or stabilizer at the interface of the two liquids allows a stable equilibrium to be attained in emulsion form by lowering the interfacial tension of one or the other or both of the immiscible liquids (in the case under discussion, lowering the surface tension of the oil more than of the water) thus counteracting the forces that, in the absence of the stabilizer, would cause coalescence of the dispersed particles. An emulsion is in a condition of greatest stability, as an emulsion, when the dispersed constituent is in the form of minute spherical particles, and the enveloping film of emulsifying agent is continuous and uniform. Mechanical agitation of such an emulsion brings about a deformation in the shape of the disperse particles, increasing their surface area, thus momentarily altering the distribution and disturbing the continuity of the film of stabilizing agent and unbalancing the equilibrium of forces at the interface. If at the instant of such unstable equilibrium other forces or reagents are present having a tendency to remove, neutralize or modify the effect of the stabilizing agent, or a tendency to facilitate the coalescence of the dispersed particles, or both, then the momentary condition of unstable equilibrium facilitates the effectual action of these other forces or reagents. Such, in our method, is the characteristic function of mechanical agitation of the emulsion, this mechanical agitation being carried on continuously during the other actions and until said other actions have completed their work. Of course, the agitation also has the function of distributing the reagents, keeping them suspended in the emulsion, and bringing them into repeated intimate contact with the emulsion particles.

However slightly the mechanical disturbance temporarily decreases the condition of stability, we have found that it is in practice a necessary element of our complete procedure. And in practice we use a comparatively gentle agitation rather than a violent one. For instance, such agitation may be brought about by gently stirring the liquids, or by circulating them through pipes or containers or by blowing air or gas through them. A simple manner of carrying on our method may involve merely placing the emulsion in a container and agitating it gently, adding the other substances hereinafter specified, the agitation performing not only the functions hereinbefore stated but also causing the other substances to be distributed thoroughly and uniformly throughout the emulsion. On the other hand, agitation may be attained by forcing the emulsion through a pipe or container which contains the reagents as a porous filling. Various apparatus and mechanical arrangements for carrying on the method will occur to those skilled in the art and need no detailed explanation here.

*II—Neutralizing the effect of or modifying or removing the emulsifying agent*

(a) As we have mentioned before, emulsifying agents that stabilize water-in-oil emulsions, have the property of lowering the surface tension of oil more than that of water. By adding substances of the opposite nature; that is, substances that lower the surface tension of water more that of oil, the effect of the original emulsifying agent is neutralized or balanced. The second mentioned substance is in fact an emulsifying agent that will stabilize an oil-in-water emulsion. Examples of the first mentioned substances, that stabilize water-in-oil emulsions, are calcium or magnesium compounds, both organic and inorganic, these substances being most prevalent as emulsifying agents in natural petroleum emulsions. Other soluble emulsifying agents are also found, for instance metallic salts such as manganese or iron salts and other mineral salts found in ground waters; and there are also insoluble emulsifying agents, such as finely divided solid carbonaceous matter, clays, micas, etc. Examples of the second mentioned substances, that will form a stabilized oil-in-water emulsion, are the sodium or potassium compounds such as the hydroxides or the soaps of the fatty acids. Thus, in a typical case of a water-in-oil emulsion, the addition of such substances as the sodium and potassium soaps in the proper amount will create a tendency, under agitation, to transform the water-in-oil emulsion into an oil-in-water emulsion. In so reversing an emulsion it is carried through what we may term its neutral state. If reagents are then present which will arrest the change in form at this neutral state, the previously dispersed particles will coalesce or can be caused to coalesce by such reagents and formed into a continuous phase. Such coagulating agents are provided as set forth in Division III hereinafter.

The procedure explained just above applies to emulsions in which the original emulsifying agent is of any of the characters set out above: i. e., either soluble or insoluble, etc. And it will be clear that such procedure may be applied to an emulsion of the oil-in-water type, where, for instance, the sodium or potassium compounds may be the emulsifying agents. In that case any of the first mentioned emulsifying agents will neutralize the effect of the original agent.

The amount of the second emulsifying agent necessary for neutralizing the effect of the original agent naturally depends on the character and amount of that original agent and must be determined for different emulsions. However, in a typical average case, to give an idea of proportions, a single drop of one-hundred-normal sodium hydroxide solution has been sufficient to neutralize the emulsifying agent in 100 c. c. of water-in-oil emulsion.

(b) In the immediately preceding paragraph (a) we have described how the effect of the emulsifying agent can be neutralized or opposed. We now proceed to describe how the same general ends may be attained by modifying or removing, or both modifying and removing, a more or less soluble stabilizing agent.

The stabilizing agent may be modified by changing its chemical and/or physical constitution in such a way that it no longer has the property of lowering the surface tension of the oil more than water, thus destroying its ability to stabilize a water-in-oil emulsion. This effect is, more specifically, accomplished in our method by replacing the calcium or magnesium or other metallic ions in the stabilizing substance by sodium or potassium ions.

We have found that the zeolite or "permutit" class of minerals, either natural or synthetic, and for instance such as bentonite, can be used to modify the emulsifying agent as described above as well as physically as referred to hereinafter. These zeolite minerals are hydrous silicates containing a small amount of sodium in which a part of the sodium ions are loosely bound. Bentonite is an example of such minerals. These minerals sometimes contain potassium in place of sodium, the potassium ions being thus loosely bound. When such a reactive substance is put into intimate contact with the emulsion, under the stability disturbing influences above described, there is an equivalent exchange of magnesium or calcium or metallic ions, on the one hand, for sodium or potassium ions, on the other; and the emulsifying agents are thereby modified so as to lose their property of stabilizing a water-in-oil emulsion, by virtue of the replacement, for instance, of its calcium ion by a sodium ion.

We have also found that soluble sodium and potassium compounds, such as the hydroxides, that give up their sodium and potassium ions in solution, can be used to effect the above described modification of the emulsifying agent. It is important, however, to avoid an excess of sodium and potassium ions in this reaction, and for that reason the use of the surface active substances such as the zeolites and bentonite clay is more practicable, since in that case the exchange of ions must always be an equivalent interchange. In using the soluble sodium and potassium compounds, it is difficult to control the quantity so as to obtain an equivalent interchange, furthermore the soluble products from this reaction introduce a variable factor that may overbalance its beneficial effect. In the use of the insoluble minerals, the action being one of equivalent replacement and taking place at the surface of the particles, no excess of free sodium and potassium ions can be present in the system, and no objectionable products are formed from the reaction.

(c) There is also another advantage in using the surface active insoluble substances of the zeolite class; bentonite more particularly, as containing more adsorptive materials. By adsorbing and thus gathering together the fine particles of the emulsifying agent, whether soluble or solid, and thus collecting a number of fine particles into larger aggregates, the stabilizing effectiveness of the emulsifying agent is reduced, and furthermore it is eventually caused to settle out of the system by sedimentation. Thus the zeolite class of minerals not only chemically modify the stabilizing agent, but also physically modify its effect and actually aid in its removal.

Any one of the actions described in paragraphs (a), (b) and (c) above may be utilized in our method for the purpose of neutralizing or modifying the effect of the emulsifying or stabilizing agent. That described in paragraph (a) may be used, but we prefer in practice to use that described in paragraph (b), and the effect described in paragraph (c) naturally accompanies that described in paragraph (b). The final effect of any of these specific operations is to modify and/or neutralize and/or remove the forces that hold the emulsions in stability.

With the stabilizing forces removed or rendered ineffectual, the dispersed particles can be caused to coalesce into larger particles and thus into a continuous phase. This last mentioned operation is typically performed as explained hereinafter.

In most emulsions known to us, where the emulsifying agent may be composed of both soluble and solid agents, a modification of the soluble agents is sufficient to facilitate the coalescence of the dispersed particles. And some emulsions in which the emulsifying agent is entirely composed of finely divided solid matter may not require any operation for neutralizing or modifying the emulsifying agent. In this connection it may be noted that the mechanical agitation is, if anything, more effective as applied to an emulsion stabilized by a solid emulsifying agent. Therefore, at least with some emulsions containing a solid emulsifying agent, it may be only necessary to apply mechanical agitation and the reagents for coalescing and collecting the dispersed particles as explained hereinafter. But in other cases it may be necessary either to use the procedure prescribed in paragraph (a) above for neutralizing the effect of solid emulsifying agents or utilize the solid reagents as explained in paragraph (b) above for their adsorptive and coagulating effect on the solid emulsifying agent.

III—Facilitating coalescence of the dispersed particles

The final coalescence of the dispersed particles is brought about in our method by the use of substances or compounds which are preferentially wetted by oil or water. For instance we have found that substances or compounds whose interfacial tension against water is less than against oil—substances preferentially wetted by water—are effective in facilitating the coalescense of dispersed water particles and hence aid in accelerating the gathering of the water into a continuous phase.

Examples of such substances which we have used are classed under minerals or synthetic compounds having a glassy or vitreous lustre, for example quartz, or other silicates, calcite, fluorspar and like substances.

For the final separation of a water-in-oil emulsion the use alone of such preferentially water wetted substances will suffice. If the emulsion should be of the oil-in-water type, then substances preferentially wetted by oil would be used. Such substances as belong to the class of the sulphides of heavy metals, for example iron pyrites, are instances. Substances having a resinous or metallic lustre will serve for this purpose.

However, we have found that the simultaneous use of both classes of preferentially wetted substances is very effective in breaking down either type of emulsion. Thus in the final breaking down of the water-in-oil emulsion we find it effective to use both a siliceous material (for instance fine sand) and an iron sulphide, finely divided. It is easily understood that if the particle of emulsion is in simultaneous contact with a substance preferentially wetted by water and also with a substance preferentially wetted by oil, the interfacial forces at the point of contact acting in opposite directions cause the oil film surrounding the water particle to flow to the sulphide particle and the water to flow to and from a film around the siliceous particle. Thus, in a practical operation of our method, we may use either a substance which is preferentially wetted by the liquid of the disperse phase, alone, or we may simultaneously use both preferentially wetted substances as described above.

We have also found that liquids whose interfacial tension against water is less than against oil, for example water or water soluble or water-miscible liquids, are effective in promoting coagulation of the dispersed particles of water, and hence aid the separation of a water in oil emulsion. The action of such liquids is analogous to the action of the preferentially wetted solids described above. The presence of free water or other water miscible liquids in the system provides a liquid with which a particle of emulsified water can immediately unite and coalesce at the instant it is freed from the surrounding film of emulsifying agent. The use of water in such emulsions is also advantageous, in some instances at least, for aiding in the rapid and uniform distribution of the solid particles. For instance, in an emulsion which has no free water and in which the water is in very fine state of dispersion, we find it useful to introduce the zeolite minerals in a creamy admixture with water, thus aiding the distribution of the mineral.

The final result reached by our process is thus the coalescence of the dispersed particles into a continuous phase and the subsequent settlement of one liquid out of the other. The disperse emulsifying agents are also aggregated or caused to coalesce and largely caused to settle out with the water. The settlement of the bentanite, for instance, is a factor causing settling of the agents; and the settling sand or other reagents helps mechanically to carry down the emulsifying agents. The general interaction of the several operations carried on will be readily understood from what has been said before. The mechanical disturbance of the stability of the emulsion by agitation opens a point of attack for the other reagents, and further aids their action by distribution. Acting thus under the opportunity created by disturbance of equilibrium, the reagents act upon the emulsifying agent, or neutralize or modify its stabilizing force, in such a manner as effectively to remove the causes that stabilize the emulsion and prevent coalescence of the water. These causes being removed, the coalescing forces are then brought into effective play to facilitate coalescence of the dispersed particles into a continuous phase.

In the practice of our method we prefer to use the reagents in as finely divided form as practicable. For instance we have with very good effect, used the zeolite minerals and bentonite clay of about colloidal size to 30 mesh, and sand of about 150 to 30 mesh, or precipitated silica. The finer particles give more rapid action.

We have discovered that, as applied to some particular classes of emulsions, typically those that break up more easily, either the operations specified under Division II above or those specified under Division III above may be dispensed with and the emulsion eventually broken up and separated. However, for emulsions that are difficult to break up and separate, and for the relatively quick breaking and separation of practically all emulsions, we find that both specified classes of operations are desirable. We have found, however, that without agitation and its physical equilibrium disturbance, neither or both of the classes of operations II and III above are of any practical effect in breaking down a stable emulsion.

As practical instances of the application of our method we may state that for instance in the treatment of petroleum oil containing 40 per cent of emulsion, and using sand and zeolite, under the influence of gentle agitation and maintaining a temperature of 140° F., the percentage of emulsion was reduced in 90 minutes from 40 per cent to 1 per cent. The amounts of sand and zeolite in this case were each one-eighth the amount of oil by volume.

Under similar conditions and with the same emulsion, using an amount of sand equal in volume to one-quarter the amount of oil, but using only 0.625 gms., of bentonite for each 400 cc., of oil and emulsion, at the end of 115 minutes the emulsion was reduced from 40 per cent., to 1 per cent.

Under similar conditions, but using a still larger proportion of sand (sand to oil 15 to 40 by volume) and using 10 gms., of sulphide and 0.5 gms., of bentonite for each 400 cc., of oil, an initially 60 per cent., emulsion was reduced to a trace in 40 minutes.

Under similar conditions, using sand in the proportion of 1 to 8 of the oil by volume and a similar proportion of sulphide, and 0.625 gms., of bentonite per 400 cc. of oil, and water in the proportion of 1 to 4 of oil by volume, an initially 40 per cent emulsion was reduced to 0.6 per cent in 30 minutes.

With another emulsion which was more easily broken up, and using 1 volume of sand to 4 volumes of oil and a like proportion of water, and 0.625 gms., of bentonite per 400 cc., of oil, an initially 30 per cent., emulsion was completely cleaned in 30 minutes.

We claim:

1. A method of separating oil-and-water emulsions which contain emulsifying agents that includes: mechanically agitating the emulsion to disturb its equilibrium and to bring the emulsion into intimate contact with the reagents mentioned hereinafter, and treating the emulsion during disturbance with a relatively minute quantity of substantially insoluble zeolite minerals and also with a relatively large quantity of substantially insoluble substance preferentially wetted by one of the emulsion constituents, the extent of said preference being not substantially less than that shown by sand for water or iron sulfid for oil.

2. A method of separating oil-and-water emulsions which contain emulsifying agents that includes: mechanically agitating the emulsion to disturb its equilibrium and to bring the emulsion into intimate contact with the reagents mentioned hereinafter, and treating the emulsion during disturbance with a relatively minute quantity of substantially insoluble zeolite minerals and also with a relatively large quantity of a substantially insoluble substance preferentially wetted by water the extent of said preference being not substantially less than that shown by sand.

3. A method of separating oil-and-water emulsions which contain emulsifying agents, that includes mechanically agitating the emulsion to disturb its equilibrium and to bring the emulsion into intimate contact with the reagents mentioned hereinafter, and treating the emulsion during disturbance with zeolite minerals and also with substances respectively preferentially wetted by oil and water.

4. A method of separating oil-and-water emulsions which contain soluble emulsifying agents that includes: mechanically agitating the emulsion to disturb its equilibrium and to bring the emulsion into intimate contact with the reagents mentioned hereinafter, and treating the emulsion during disturbance with a relatively minute quantity of zeolite minerals and also with a relatively large quantity of siliceous material.

5. A method of separating oil-and-water emulsions which contain soluble emulsifying agents, that includes mechanically agitating the emulsion to disturb its equilibrium and to bring the emulsion into intimate contact with the reagents mentioned hereinafter and treating the emulsion during disturbance with zeolite minerals and also with siliceous materials and metallic sulphides.

6. A method of separating oil-and-water emulsions which contain soluble emulsifying agents, that includes mechanically agitating the emulsion to disturb its equilibrium and intimately to distribute the reagents mentioned hereinafter, and treating the emulsion during disturbance with finely divided zeolite minerals and also with finely divided sand and metallic sulphides.

7. A method of separating oil-and-water emulsions, that includes: mechanically agitating the emulsion to disturb its equilibrium, treating the emulsion with a relatively minute quantity of a substantially insoluble inorganic reagent having the property of reducing the emulsifying effect of the emulsifying agent in the emulsion, thereby to produce in the emulsion to an extent not substantially less than that of a zeolite mineral substantially a state of neutral equilibrium, and simultaneously treating the emulsion with a relatively large quantity of a substantially insoluble substance preferentially wetted by one of the emulsion constituents, the extent of said preference being not substantially less than that of sand for water or iron sulfid for oil to cause agglomeration of that constituent when the emulsion reaches substantially the state of neutral equilibrium.

8. A method of separating emulsions, that includes mechanically agitating the emulsion to disturb its equilibrium, treating the emulsion with a reagent having the property of spontaneously reducing the emulsifying effect of the emulsifying agent in the emulsion, to only a state of neutral equilibrium, and simultaneously treating the emulsion with substances preferentially wetted each by one of the emulsion constituents, thereby to cause agglomeration of the emulsion constituents when the emulsion reaches said neutral state.

9. A method of separating emulsions of oil and water of the water-in-oil type, that includes mechanically agitating a liquid body of the emulsion in contact with a predetermined quantity of zeolite minerals, and in the intimate presence of finely divided substances respectively preferentially wetted by oil and water and dispersed within said liquid body of the emulsion, so as to initiate a change in the state of the emulsion from the oil-in-water type to the water-in-oil type and to arrest and control such change at the neutral stage between the two types of emulsions.

10. A method of separating emulsions of oil and water of the water-in-oil type, that includes mechanically agitating the emulsion in contact with a predetermined quantity of zeolite minerals, and at the same time in the intimate presence of iron sulphide minerals which are preferentially wetted by oil and quartz minerals which are preferentially wetted by water, so as to initiate a change in the state of the emulsion from the water in oil type to the oil-in-water type and to arrest and control such change or state at the neutral stage between the two types by aggregation of the two emulsion constituents into continuous phases on their respective preferentially wetted substances.

11. A method of separating emulsions of oil and water of the water-in-oil type, that includes mechanically agitating the emulsion in contact with a predetermined quantity of zeolite minerals, and at the same time in the intimate presence of iron sulphide minerals which are preferentially wetted by oil and quartz minerals which are preferentially wetted by water, so as to initiate a change in the state of the emulsion from the water-in-oil type to the oil-in-water type and to arrest and control such change or state at the neutral stage between the two types by aggregation of the two emulsion constituents into continuous phases on their respective preferentially wetted substances, and then separating the two aggregated constituents by gravity settlement and separating the minerals with the constituent of greater specific gravity.

12. A method of separating an emulsion of oil and water, which includes: agitating the emulsion in the presence of a substantially insoluble inorganic reagent tending to reverse the type of the emulsion and in the presence of substantially insoluble substances which are respectively wetted preferentially by water and by oil, the extent of said preference being not substantially less than the preferences of sand for water and of iron sulfid for oil.

13. A method of breaking an emulsion of the water-in-oil type, which includes: simultaneously and continuously agitating said emulsion with a mixture comprising a relatively large proportion of a finely divided substantially insoluble solid material which is preferentially water wetted the extent of said preference being not substantially less than that shown by sand and a relatively minute proportion of a finely divided, solid, inorganic material insoluble in water but capable materially modifying the emulsifying agent of the emulsion to reduce the stabilizing action thereof.

14. A method of breaking an oil-and-water emulsion, which includes: intimately contacting said emulsion with a mixture of a relatively minute proportion of a finely divided zeolite and a relatively large proportion of a finely divided substantially insoluble material preferentially wetted by the disperse phase of the emulsion, the extent of said preference being not substantially less than that shown by sand for water or by iron sulfid for oil.

15. A method of separating emulsions, that includes mechanically agitating the emulsion to disturb its equilibrium, and facilitating coalescence of the dispersed liquid particles of the emulsion by effectively reducing the stabilizing action of the emulsifying agent therein and by simultaneously contacting the emulsion with substances which are respectively wetted preferentially by the phases of the emulsion.

16. A method of separating the phases of a previously formed water and oil emulsion, which comprises: adding to and intimately dispersing in a liquid body of said emulsion a substantially insoluble solid material preferentially wetted by the water phase, the extent of said preference being not substantially less than that shown by sand, and a substantially insoluble solid material preferentially wetted by the oil phase, the extent of said preference being not substantially less than that shown by iron sulfid, thereby resolving said emulsion into its oil and water constituents.

17. A method of separating the phases of a previously formed emulsion, which comprises: adding to a liquid body of said emulsion finely divided siliceous material and a finely divided mineral having a metallic lustre, and dispersing both said finely divided materials within the liquid body, thereby resolving said emulsion into its constituents.

18. A method of separating the phases of a previously formed emulsion, which comprises: adding to a liquid body of said emulsion finely divided siliceous matter and a finely divided sulphide having a metallic lustre, and dispersing both finely divided materials within the liquid body, thereby resolving said emulsion into its constituents.

19. A method of separating the phases of a previously formed emulsion, which comprises: adding to a liquid body of the emulsion a mixture of finely divided siliceous matter and finely divided iron sulphide and mechanically agitating said liquid body to disperse said mixture therein, thereby resolving said emulsion into its constituents.

20. A method of breaking an emulsion of the water-in-oil type, which includes: simultaneously and intimately intermixing with said emulsion a mixture composed of a relatively minute proportion of a finely divided substantially insoluble inorganic reagent capable of modifying the emulsifying agent of said emulsion, a relatively large proportion of a finely divided substantially insoluble substance preferentially wetted by the water phase of said emulsion, the extent of said preference being not substantially less than that shown by sand, and free water.

21. A method of separating oil-and-water emulsions which contain emulsifying agents, that includes mechanically agitating the emulsion to disturb its equilibrium and to bring the emulsion into intimate contact with the reagents mentioned hereinafter, and treating the emulsion during disturbance with zeolite minerals and also with a comminuted solid material having a glassy lustre and a communited solid material having a metallic lustre.

22. A method of breaking an emulsion of the water-in-oil type, which includes intimately mixing said emulsion with a mixture composed of a relatively small amount of a finely divided solid water-insoluble reagent capable of modifying the emulsifying agent of said emulsion, a finely divided solid substance preferentially wetted by the water phase of said emulsion, a finely divided solid substance preferentially wetted by the oil phase of said emulsion, and free water.

23. A method of breaking an emulsion of the water-in-oil type, which includes intimately mixing said emulsion with a mixture composed of a relatively small amount of a finely divided reagent capable of modifying the emulsifying agent of said emulsion, a finely divided solid water-insoluble substance having a vitreous lustre, a finely divided solid water-insoluble substance having a metallic lustre, and free water.

24. A method of breaking an emulsion of the water-in-oil type, which includes intimately mixing said emulsion with a mixture composed of a relatively small amount of a finely divided solid reagent capable of modifying the emulsifying agent of said emulsion, a finely divided siliceous material, a finely divided metallic sulfid, and free water.

In witness that we claim the foregoing we have hereunto subscribed our names this 21 day of April, 1927.

WALTER ARTHUR BROWN.
GOTTHOLD HARRY MEINZER.